April 21, 1953  G. A. KENDALL  2,635,897
TRAILER AND WHEEL SUSPENSION THEREFOR
Filed Oct. 3, 1950  3 Sheets-Sheet 1
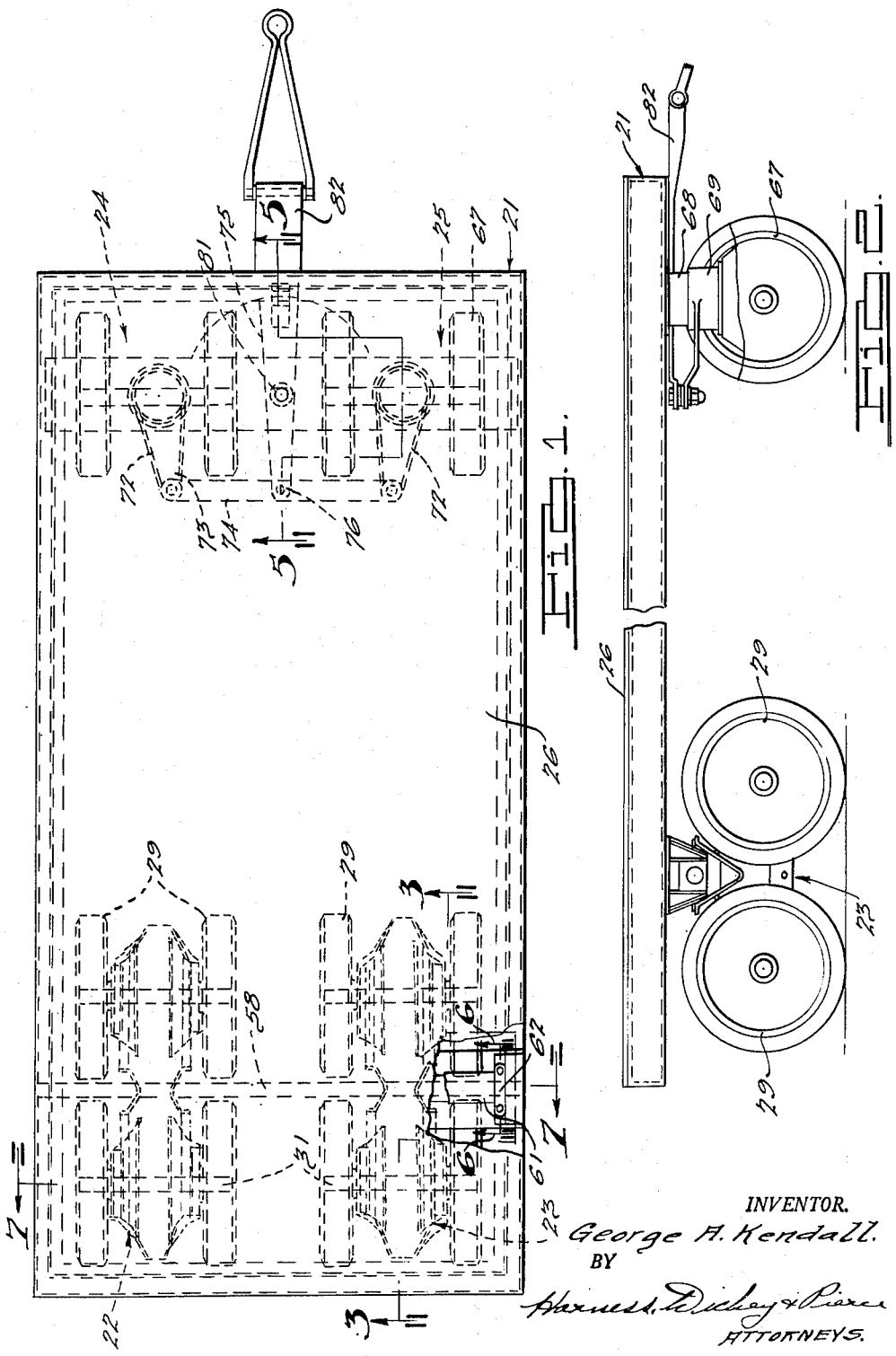
INVENTOR.
George A. Kendall
BY
Harness, Dickey & Pierce
ATTORNEYS.

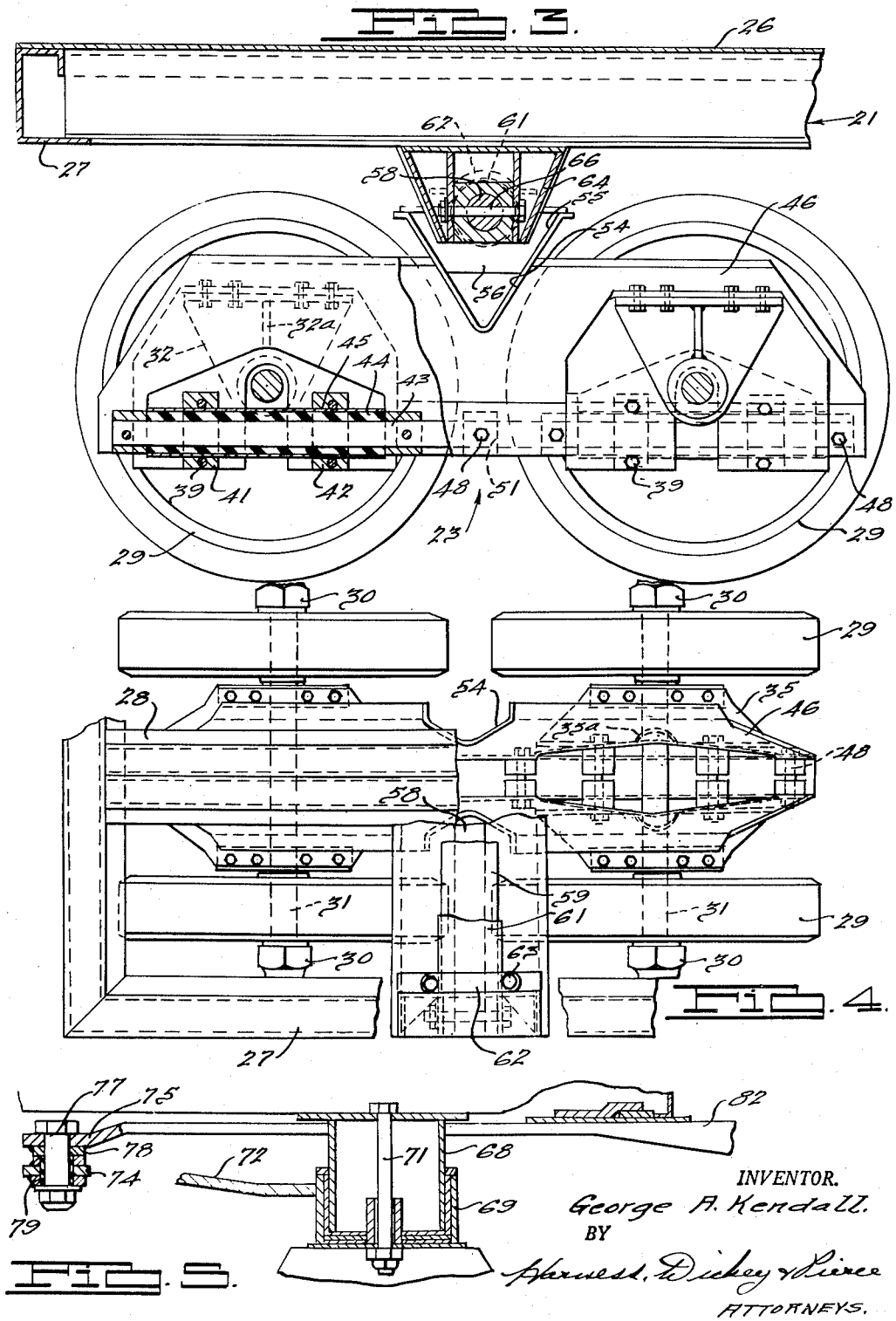

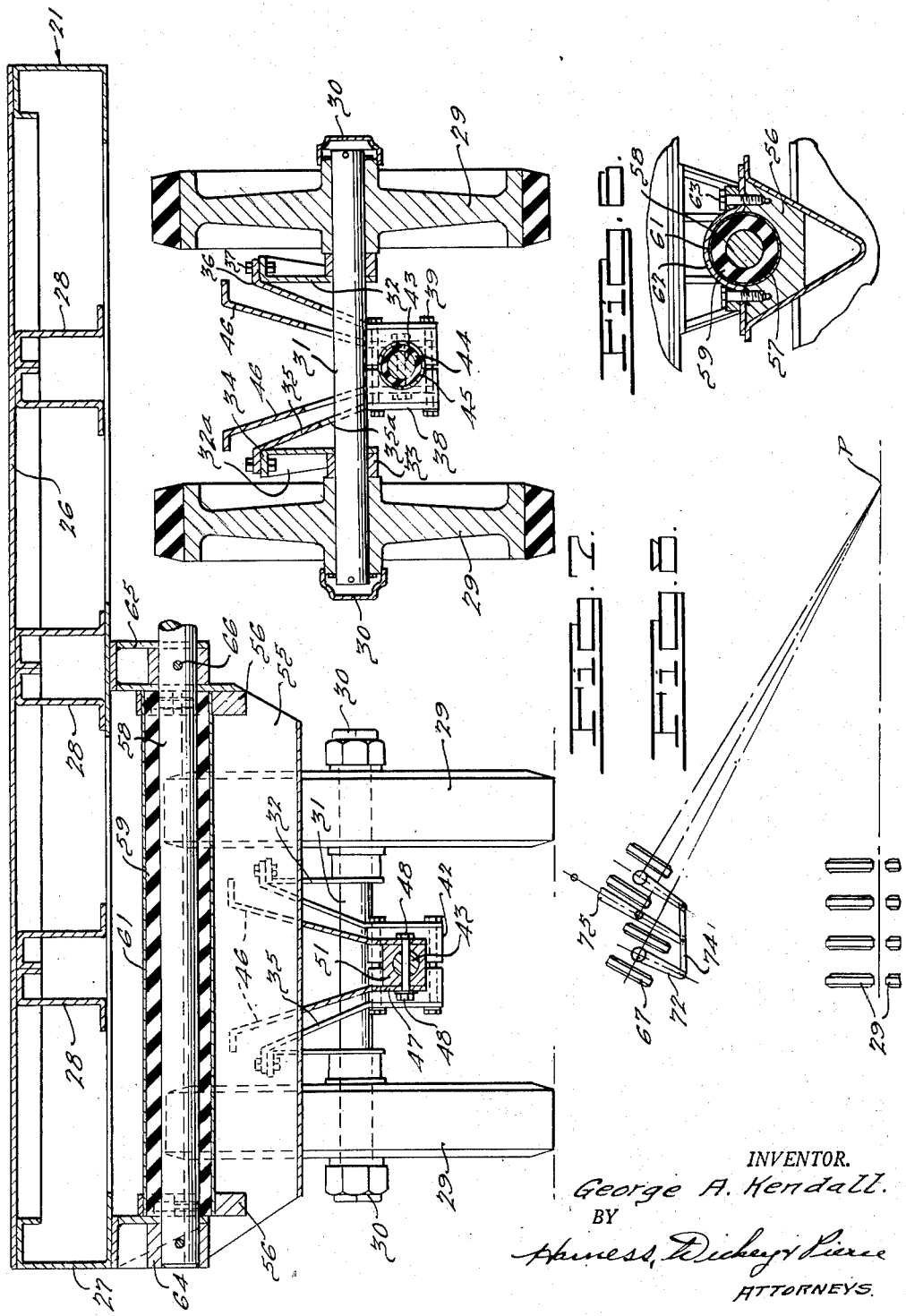

Patented Apr. 21, 1953

2,635,897

UNITED STATES PATENT OFFICE 2,635,897

TRAILER AND WHEEL SUSPENSION THEREFOR

George A. Kendall, Windsor, Ontario, Canada

Application October 3, 1950, Serial No. 188,087

11 Claims. (Cl. 280—104.5)

This invention relates to trailers and more particularly to wheel suspensions.

It is an object of the present invention to provide a wheel suspension structure particularly adapted for trailers having a plurality of sets of wheels in tandem on each side of the trailer. More particularly, it is an object to provide a wheel mounting structure and suspension means for such a trailer wherein relative movement will be allowed between the sets of wheels and between the wheels in each set, thereby absorbing shocks due to road unevenness either along or transverse to the direction of movement.

It is another object to provide a trailer wheel mounting structure as described, in which every wheel will tend to be at all times in contact with the roadway, thus distributing the load over a larger tire and pavement area. More specifically, it is an object to provide suspension means for a trailer having a plurality of sets of dual wheels in tandem relation on each side of the trailer, the suspension comprising a resilient support for the axle of each set of dual wheels allowing the axle to rock in a transverse plane, and a separate resilient support for the tandem wheel assembly on each side of the trailer, allowing each tandem assembly as a whole to rock in a longitudinal plane.

In the drawings:

Figure 1 is a plan view of the trailer showing the arrangement of the wheel trucks and of the steering gear, parts being omitted for clarity;

Fig. 2 is a side elevational view of the trailer shown in Fig. 1;

Fig. 3 is a side cross-sectional view of a tandem wheel truck and its mounting suspension taken along the line 3—3 of Fig. 1;

Fig. 4 is an enlarged plan view of a portion of the trailer adjacent one tandem wheel truck, the carrier portion and other parts of the unit being removed for clarity;

Fig. 5 is a cross-sectional view taken along the line 5—5 of Fig. 1 and showing some of the structural elements of the steering mechanism;

Fig. 6 is a cross-sectional view taken along the line 6—6 of Fig. 1 and showing the structural arrangement of the tandem rocker assembly support;

Fig. 7 is a cross-sectional view taken along the line 7—7 of Fig. 1 and showing the tandem and axle rocker assemblies; and Fig. 8 is a schematic view of the steering arrangement.

The trailer comprises in general a carrier body or platform 21 and a plurality of sets of wheels suspended therebelow. In the illustrated embodiment, the rear of the trailer is shown as having two tandem wheel truck assemblies 22 and 23, and the front as having two front wheel assemblies 24 and 25, the front wheel assemblies being used for steering purposes. It will be understood, however, the principles of this invention may be embodied in trailers which are steered from either the front or rear end, further that the structural details of the wheel assemblies in the illustrated embodiment, such as the number of wheels, are not intended to limit the invention to this specific design.

The carrier body of the trailer comprises a platform 26, with outer platform rails 27 and inner platform rails 28 supporting platform 26. The wheel assemblies are suspended to the underpart of the carrier body in a manner to be later described. Each tandem wheel assembly comprises two sets of wheels in tandem relation as shown best in Figs. 2 and 3. Each of these sets comprises two wheels 29 of identical shape having hub caps 30 and rotatably mounted at opposite ends of a common axle 31, as shown in Fig. 7. Supported by this axle immediately inwardly of the wheels is a pair of oppositely disposed anchor plates 32 of generally V-shape, as shown in Figs. 3 and 7. Each of these plates has a strengthening rib 32a and has secured thereto at its lower end a block 33 in which the axle is secured. The upper end of each plate 32 is provided with a horizontal flange 34, and a pair of downwardly converging lower supporting brackets 35 are supported by these flanges and depend between the anchor plates 32. The rocker shaft support brackets 35 are provided with horizontal flanges 36 at their upper ends which are secured to flanges 34 by bolts 37, and the brackets 35 also have parallel spaced portions 38 at their lower ends, with clearance recesses 35a in the brackets adjacent the axle. Secured between the portions 38 by means of bolts 39 are two pairs of spaced clamps 41 and 42. These clamps are adapted to firmly grip one element of a resilient rocker assembly extending longitudinally below both axles of the tandem assembly. This resilient rocker assembly comprises a cylindrical shaft 43 surrounded by a relatively thick tubular length of rubber or other resilient material 44, the rubber in turn being surrounded by two relatively thin metallic casing members 45, one below each axle. The inner and outer surfaces of the rubber are preferably vulcanized or otherwise secured to shaft 43 and casing 45 respectively, so that relative rotation between the shaft and casing will be yieldably resisted by circumferential shearing stresses in the rubber.

A pair of tandem truck frame members 46 extends longitudinally across both parts of each tandem assembly and the frames have correspondingly spaced lower extensions 47 secured to axle rocker shaft 43 by means of bolts 48, the securing points being located outwardly of the casings 45. A set of spacer blocks 51 holds the lower ends 47 of truck frames 46 in parallel spaced relation. The truck frames 46 are disposed within the lateral confines of brackets 35 and diverge upwardly but to a lesser degree than do brackets 35. As will be presently described, the truck frames 46 are connected in supporting relation with the carrier body 21 of the trailer. It will be seen that because of the resilient connection between truck frames 46 and axles 31, the truck frames may be held from rocking movement in a lateral direction even while the axles rock laterally due to road unevenness. In particular, lateral rocking movement of an axle will cause its corresponding casing 45 to rotate relative to shaft 43, setting up circumferential shearing stresses in the tubular rubber mounting 44.

As seen in Fig. 3, the truck frames 46 extend upwardly and are provided with aligned V-shaped recesses 54 between the front and rear sets of wheels in each tandem assembly. A V-shaped upper supporting bracket 55 is secured within these recesses, for example by welding, and extends upwardly therefrom, the bracket being disposed transversely to the longitudinal axis of the trailer and extending outwardly from the wheels in each tandem assembly. A plurality of lower clamp members 56 are disposed within the bracket 55 at the outer ends thereof, these clamp members having semicircular recesses 57 at their upper ends. A resilient tandem rocker assembly similar to the axle rocker assembly previously described is disposed within these recesses, the assembly comprising an inner shaft 58, a tubular rubber mounting 59 and a casing 61. A single shaft 58 may serve for the rocker assemblies of both tandems 22 and 23 and extend entirely across the trailer. Upper clamps having semicircular sections 62 are secured to lower clamps 56 by means of bolts 63 and firmly grip casing 61, holding it against movement relative to brackets 46. It will be observed that when, due to road unevenness, the front set of wheels in either tandem assembly 22 or 23 moves vertically with respect to the rear set in the same assembly, thereby rocking truck frames 46, the corresponding casing 61 will likewise rotate about an axis transverse to the vehicle. The inner shaft 58 is secured to the carrier body 21 of the trailer by means of outer carrier bracket 64 and inner carrier bracket 65 which are secured to the shaft 58 by means of bolts 66 extending radially through the shaft. The brackets 64 and 65 are disposed within the lateral confines of bracket 55 and diverge upwardly but to a lesser degree than bracket 55, the upper ends of these carrier brackets being welded or otherwise secured to the carrier body 21. It will be seen therefore that rocking movement of truck frames 46 in a longitudinal plane will not be transmitted to the carrier portion of the trailer, since the resilient connection between upper supporting bracket 55 and carrier brackets 64 and 65 will allow the carrier portion of the trailer to remain level.

In operation, when the trailer is being towed and road unevenness or other obstructions are encountered, the various resilient connections which have been described will act simultaneously in absorbing the shocks and unwanted vertical movements. In particular, when an obstruction is encountered tending to rock any of the axles 31 in a lateral plane, the corresponding casing member 45 will be caused to resiliently rotate about shaft 43, thus minimizing the degree of rocking motion which is transmitted to frame members 46 and to the remainder of the trailer. When an obstruction is encountered tending to lift one pair of wheels relative to the other in either wheel truck 22 or 23, thus rocking frame members 46 in a longitudinal plane, this rocking motion will be transmitted to casing member 61 which will resiliently rotate about shaft 58, and thus the carrier body 21 will be prevented from receiving the rocking force. It will be observed that the operation of any one of these resilient connections will in no way prevent the simultaneous operation of any other connection.

The opposite end of the trailer is provided with two front wheel assemblies 24 and 25, which as mentioined previously, have a steering function especially adapted to cooperate with the structure previously described. Each of these assemblies preferably comprises two wheels 67 mounted in spaced relation on a common axle. Two laterally spaced swivel extensions 68 are mounted beneath the carrier body 21 and extend downwardly therefrom. Each wheel assembly is provided with a swivel socket 69 which is secured to the axle between the wheels and receives the swivel extension 68, so that these connections may be of sealed fifth wheel construction. Various means may be provided for securing the swivel socket 69 to the wheel assemblies, and in particular these swivel sockets may be mounted by means of elongated resilient connections similar to those described previously for the axles 31. As shown in Fig. 5, a swivel bolt 71 extends through the swivel extension 68 and swivel socket 69, thereby securing the front wheel assemblies in swiveled relation to the carrier body.

Each swivel socket 69 has secured thereto an arm 72 which extends substantially horizontally toward the rear of the trailer. As best seen in Figs. 1 and 8 these arms 72 are so positioned that when the wheels 67 are in neutral position (straight ahead) the arms converge slightly toward each other so that the centers of the outer ends 73 thereof are spaced apart a lesser distance than are the centers of swivel sockets 69. A tie rod 74 has its opposite ends pivotally connected to the outer ends 73 of the arms 72, so that translatory movement of tie rod 74 will simultaneously rotate arms 72 about the swivel axes. A steering arm 75 has its inner end pivotally connected to the tie rod 74 at a point 76 which is preferably the midpoint of the tie rod. As seen in Fig. 5 this connection may comprise a pivot bolt 77 which extends through the steering arm 75 and the tie rod 74, as well as spacers 78, with a rubber bushing 79 provided within the tie rod aperture. The steering arm 75 is pivotally mounted to the carrier body 21 at an intermediate point 81, which is preferably in alignment with the swivel axes, and the steering arm extends toward the front of the trailer and may have attached thereto a draw bar 82.

It will be seen, especially from Fig. 8, that when the steering arm 75 is pivoted about its pivot axis 81 the inner end of the steering arm will cause translatory movement of tie rod 74, thus rotating arms 72. Due to the fact that the distance between the outer ends of arm 72 is less than the distance between the pivot axes and because of the converging nature of arms 72, a predetermined angular movement of steering arm 75 toward one side of the trailer will cause the wheel assemblies on that side to rotate a slightly greater amount than the assemblies on the other side. This will result in the axes of the axle wheel assemblies converging at a point on or close to an extension of the axes of the truck assemblies, for example, the point P in Fig. 8. The result of this construction will therefore be that sliding or rubbing action of the front wheels 67 will be minimized, especially when a sharp steering angle is applied. It will also be observed that a relatively large steering angle may be obtained with this novel construction, since the linkage arrangement is such that the various elements will not move into interfering engagement during their normal angular movements. It has been found, for example, that in a typical installation a steering angle of approximately 70° was obtainable without any interference of the parts.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. In a multiwheeled vehicle, a wheel-supporting axle, a pair of wheels in spaced relation on said axle, a pair of downwardly converging brackets mounted on and extending transversely to said axle between said wheels, a pair of spaced frame members disposed within said brackets, a resilient pivotal connection between the lower ends of said frame members and the lower ends of said brackets, a V-shaped bracket mounted on and extending transversely to said frame members, a carrier body on said vehicle, and a second resilient pivotal connection between said V-shaped bracket and said carrier body, said second resilient connection extending in transverse relation to said first connection.

2. In a multiwheeled vehicle having a carrier body and a plurality of pairs of common-axle wheels in tandem relation, suspension means for said wheels comprising a pair of downwardly converging lower supporting brackets mounted on and extending transversely to each of said axles between the wheels thereof, a pair of spaced frame members disposed within and extending between two adjacent pairs of said brackets, resilient pivotal connections between the lower ends of said frame members and the lower ends of each of said pairs of brackets, an upper supporting bracket mounted on and extending transversely to said frame members, and a resilient pivotal connection between said upper supporting bracket and said carrier body, said last-mentioned connection extending in transverse relation to said first connections.

3. In a multiwheeled vehicle having a carrier body and a plurality of pairs of common-axle wheels in tandem relation, suspension means for said wheels comprising a pair of spaced anchor plates supported by each of said axles between the wheels thereof, a pair of downwardly converging lower supporting brackets supported by each of said pairs of anchor plates and extending transversely to their respective axles, a pair of spaced frame members disposed within and extending between two adjacent pairs of said brackets, resilient pivotal connections between the lower ends of said frame members and the lower ends of each of said pairs of brackets, an upper supporting bracket mounted on and extending transversely to said frame members, and a resilient pivotal connection between said upper supporting bracket and said carrier body, said last-mentioned connection extending in transverse relation to said first connections.

4. In a multiwheeled vehicle having a carrier body and a plurality of pairs of common-axle wheels in tandem relation, suspension means for said wheels comprising a pair of downwardly converging lower supporting brackets mounted on and extending transversely to each of said axles between the wheels thereof, said brackets having clearance recesses to allow rocking motion of the axle and having their lower ends in spaced parallel relation, a pair of spaced frame members disposed within and extending between two adjacent pairs of said brackets, resilient pivotal connections between the lower ends of said frame members and the lower ends of each of said pairs of brackets, an upper supporting bracket mounted on and extending transversely to said frame members, and a resilient pivotal connection between said upper supporting bracket and said carrier body, said last-mentioned connection extending in transverse relation to said first connections.

5. The combination according to claim 2, the resilient connections between said lower supporting brackets and said frame members comprising a shaft secured between the lower ends of said frame members, a plurality of spaced tubular casing members concentric with said shaft and secured between the lower ends of said lower supporting brackets, and a relatively thick resilient element between each of said casing members and said shaft, the inner and the outer surfaces of said element being secured respectively to said shaft and said casing member.

6. In a multiwheeled vehicle having a carrier body and a plurality of pairs of common-axle wheels in tandem relation, suspension means for said wheels comprising a pair of downwardly converging lower supporting brackets mounted on and extending transversely to each of said axles between the wheels thereof, a pair of spaced frame members disposed within and extending between two adjacent pairs of said brackets, said frame members diverging upwardly but to a lesser degree than said lower supporting brackets, a shaft extending between said adjacent pairs of brackets and secured to said frame members, resilient pivotal connections between said pairs of brackets and said shaft, an upper supporting bracket mounted on and extending transversely to said frame members, and a resilient pivotal connection between said upper supporting bracket and said carrier body, said last-mentioned connection extending in transverse relation to said first connections.

7. In a multiwheeled vehicle having a carrier body and a plurality of pairs of common-axle wheels in tandem relation, suspension means for said wheels comprising a pair of downwardly converging lower supporting brackets mounted on and extending transversely to each of said axles between the wheels thereof, a pair of spaced frame members disposed within and extending between two adjacent pairs of said brackets, resilient pivotal connections between the lower ends of said frame members and the lower ends of each of said pairs of brackets, aligned recesses in the upper ends of said frame members between said resilient connections, a V-shaped upper supporting bracket secured partially within said recesses, carrier brackets secured to said carrier body and extending downwardly within said upper supporting bracket, and a resilient pivotal connection between said upper supporting bracket and said carrier brackets.

8. In a multiwheeled vehicle having a carrier body and a plurality of pairs of common-axle wheels in tandem relation, suspension means for said wheels comprising a pair of downwardly converging lower supporting brackets mounted on and extending transversely to each of said axles between the wheels thereof, a pair of spaced frame members disposed within and extending between two adjacent pairs of said brackets, resilient pivotal connections between the lower ends of said frame members and the lower ends of each of said pairs of brackets, a casing member secured to said frame members and extending transversely thereabove, a shaft extending within said casing and secured to said carrier body, and a relatively thick tubular resilient element between said casing and said shaft, the inner and outer surfaces of said resilient element being secured to said shaft and casing respectively.

9. The combination according to claim 8, the securing means between said casing member and said frame members comprising a V-shaped upper supporting bracket secured to and extending between said frame members, and clamping means at spaced intervals along said V-shaped bracket for securing the casing member thereto.

10. In a multiwheeled vehicle having a carrier body and a wheel truck assembly comprising a plurality of wheels in tandem relation, suspension means for said wheel truck assembly comprising a bracket mounted on said truck assembly between said wheels and extending transversely to the planes of said wheels, said bracket having upwardly diverging portions, a tubular casing member clamped to said bracket and extending between said portions, a shaft disposed concentrically within said casing and extending outwardly therefrom, a bracket extending downwardly from said carrier body and secured to the outwardly extending portion of said shaft, and a relatively thick tubular resilient element between said casing and said shaft, the inner and outer surfaces of said resilient element being secured to said shaft and casing respectively.

11. In a multiwheeled vehicle having a carrier body and a wheel truck assembly comprising a plurality of wheels in tandem relation, suspension means for said wheel truck assembly comprising a bracket mounted on said truck assembly between said wheels and extending transversely to the planes of said wheels, said bracket having upwardly diverging portions, a bracket mounted on said carrier body and extending downwardly therefrom within said diverging portions, and a resilient connection between said two brackets, said connection extending parallel to said truck assembly bracket, whereby relative rocking motion of said two brackets in the plane of said wheels is permitted.

GEORGE A. KENDALL.

References Cited in the file of this patent
UNITED STATES PATENTS

| Number | Name | Date |
|---|---|---|
| 1,319,303 | Norton | Oct. 21, 1919 |
| 2,360,619 | Peterman | Oct. 17, 1944 |
| 2,470,842 | Barrington | May 24, 1949 |
| 2,493,023 | Pointer | Jan. 3, 1950 |